G. P. STANLEY & W. W. & S. S. TAINTER.
MACHINE FOR BOXING TOOTHPICKS.
APPLICATION FILED NOV. 17, 1906.
904,159.
Patented Nov. 17, 1908.
3 SHEETS—SHEET 1.
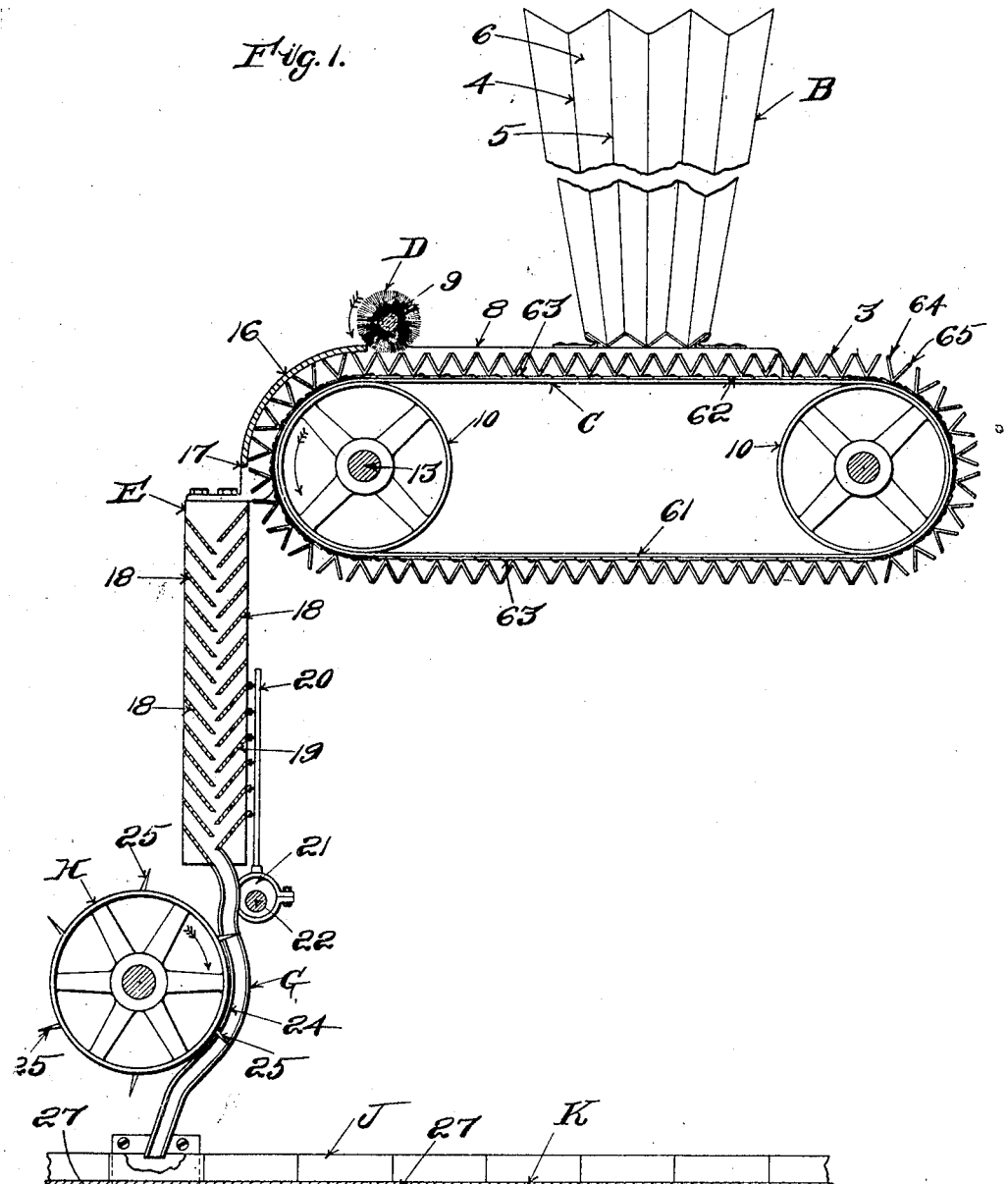

G. P. STANLEY & W. W. & S. S. TAINTER.
MACHINE FOR BOXING TOOTHPICKS.
APPLICATION FILED NOV. 17, 1906.
904,159.
Patented Nov. 17, 1908.
3 SHEETS—SHEET 2.
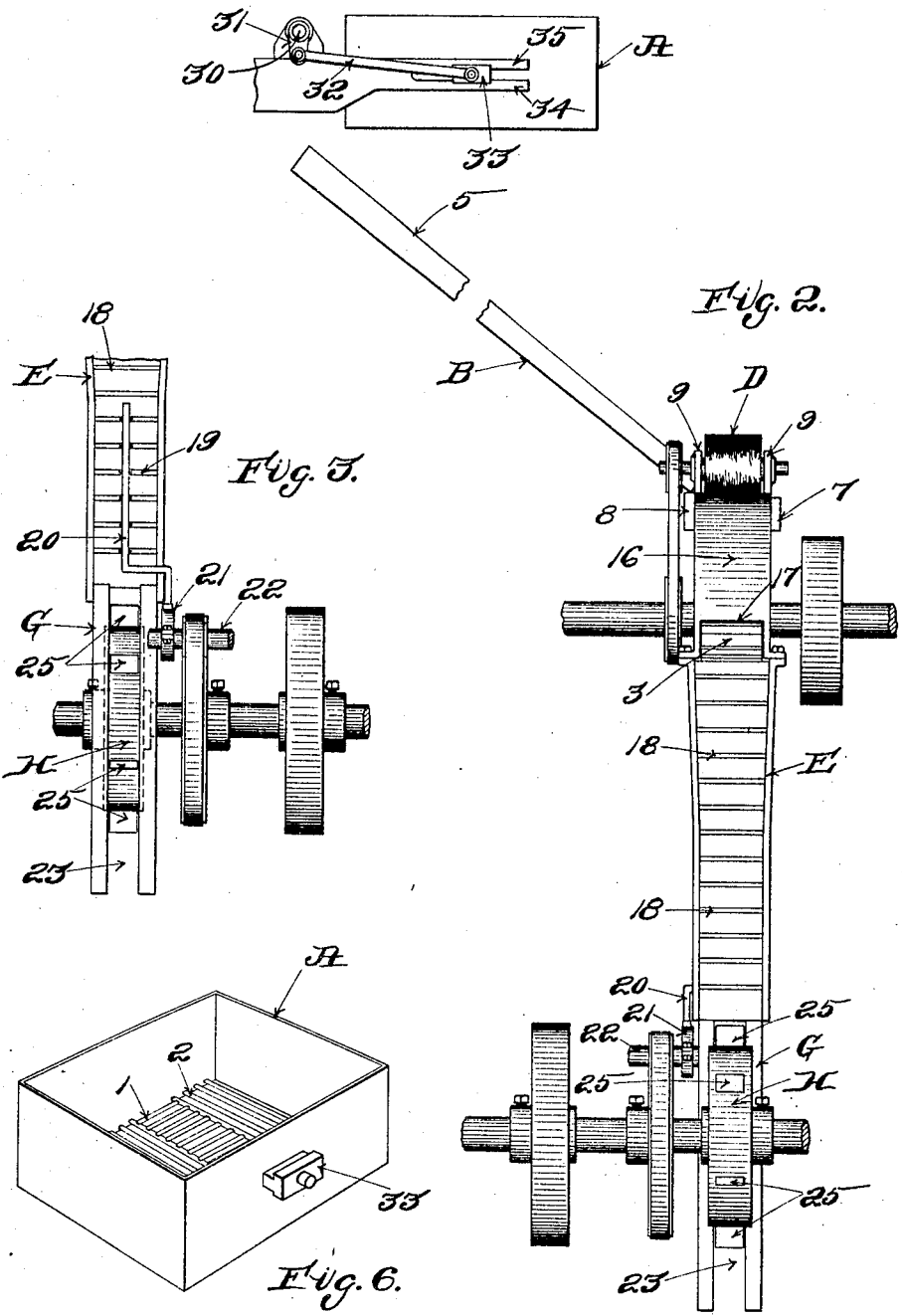

G. P. STANLEY & W. W. & S. S. TAINTER.
MACHINE FOR BOXING TOOTHPICKS.
APPLICATION FILED NOV. 17, 1906.
904,159.
Patented Nov. 17, 1908.
3 SHEETS—SHEET 3.
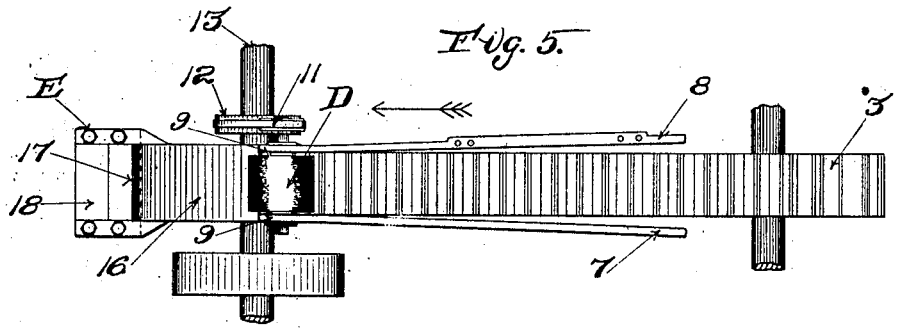
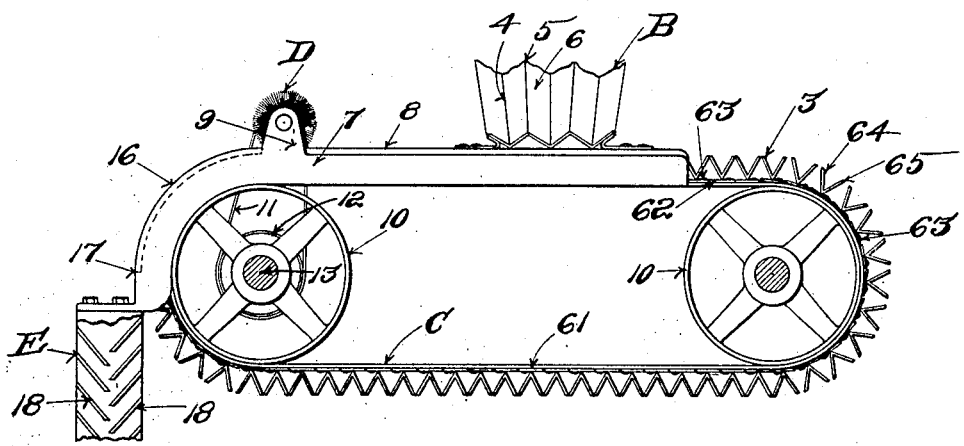
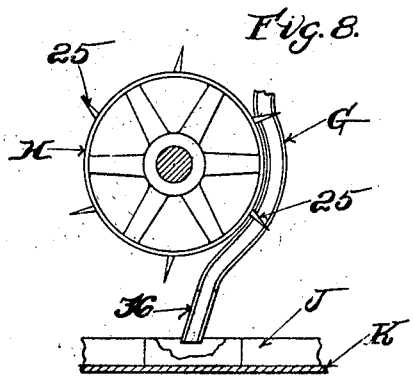
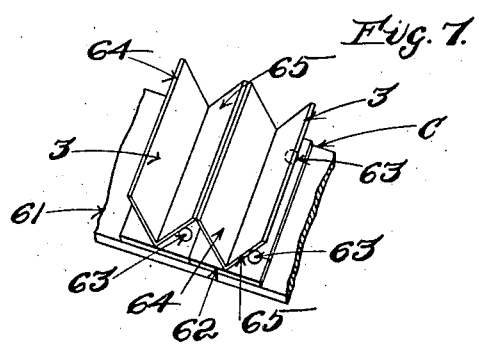
Witnesses:
John H. Parker
Aline Tarr
Inventors:
George P. Stanley
Willis W. Tainter
Simon S. Tainter
by Macleod, Calver, Copeland & Dike
Attorneys.

UNITED STATES PATENT OFFICE.

GEORGE P. STANLEY, WILLIS W. TAINTER, AND SIMON S. TAINTER, OF DIXFIELD, MAINE.

MACHINE FOR BOXING TOOTHPICKS.

No. 904,159.     Specification of Letters Patent.     Patented Nov. 17, 1908.

Application filed November 17, 1906. Serial No. 343,889.

*To all whom it may concern:*

Be it known that we, GEORGE P. STANLEY, WILLIS W. TAINTER, and SIMON S. TAINTER, citizens of the United States, residing at Dixfield, county of Oxford, State of Maine, have invented a certain new and useful Improvement in Machines for Boxing Toothpicks, of which the following is a specification, reference being had therein to the accompanying drawings.

Wooden tooth picks are usually sold in small boxes containing from one hundred to five hundred picks. These boxes are filled by hand, so far as known to us, and the labor of filling them is a relatively large item of expense in a tooth pick factory.

Our invention has for its object to provide a machine which will receive the picks from the tumbling apparatus in which they are finished and will deliver them into the boxes in which they are sold, the mechanism being such that the machine will deliver to each box the number of tooth picks required to fill the box, whether the box be large or small.

The machine consists of a series of connected and coöperating mechanism, all arranged and operating as will be hereinafter more fully set forth, and as is shown in the accompanying drawings.

The novel features of the invention are pointed out and clearly defined in the claims at the close of the specification.

Referring to the drawings, Figure 1 is an elevation partly in section of an apparatus embodying our invention. Fig. 2 is an end elevation. Fig. 3 is a detail of the partitioned-passage through which the picks pass on the way to the box and showing the mechanism for operating the movable partitions. Fig. 4 is a side elevation and Fig. 5 is a plan view of the conveyer mechanism which receives the picks from the chute leading from the hopper and serves to carry them to and deliver them into the partitioned-passage. Fig. 6 is a perspective showing the hopper with the barred or slatted bottom. Fig. 7 is a detail in perspective of a portion of the conveyer showing two of the buckets. Fig. 8 shows a modification of the lower end of the slatted passageway.

Referring to the drawings A is the hopper in which the picks are placed after they have been tumbled or otherwise finished, and are ready to be packed in the boxes in which they are sold. The hopper A is provided with a barred or slatted bottom formed as shown Fig. 6, with openings between the adjacent bars. The bars are placed so that portions of them, for example those that are designated 1 in Fig. 6, are placed at right angles to other portions of them, such as are designated 2 in Fig. 6. The object of this construction is to provide a series of parallel slits or openings through which individual picks in the hopper may fall, and to have these slits—some of them, at right angles to others so that the picks which lie in all positions in the mass in the hopper may each be given an opportunity to drop through the bottom thereof. The hopper is shaken or agitated laterally or vertically or both by any suitable mechanism.

At Fig. 2 a simple form of mechanism for accomplishing the lateral reciprocation of the hopper is shown. This consists of a shaft 30 which is driven by suitable means, not shown, and which is provided with a crank arm 31 to which is pivoted one end of a connecting rod 32, the other end of which is pivoted to a slide block 33 which may be rigidly secured to the end of the hopper A. The said slide block 33 is arranged to slide in ways 34, 35, as will be clear. As the shaft 30 revolves the hopper will be reciprocated. As will be obvious any well known form of mechanism for effecting the agitation of the hopper may be employed.

The individual picks which are placed in a disordered mass in the hopper will, as the latter is agitated, drop through onto the slide or chute B down which they pass to the buckets 3 of the conveyer C. The chute B is corrugated in cross section as shown Fig. 1, so as to form a number of valleys 4, which are separated by corresponding ridges 5 having sloping sides 6. The tooth picks falling through the slotted bottom of the hopper A quickly assume a position lengthwise of the chute B in the valleys 4 thereof and thence slide downwardly into the buckets 3 of the conveyer C. The said ridges 5 and valleys 4 converge or grow narrower toward the lower end of the chute, as seen in the drawings, and particularly in Fig. 1 so that the stream of tooth picks contained in the chute is more readily delivered to the buckets of the conveyer C. By regulating the speed of the conveyer with reference to the number of picks which drop from the hopper and are discharged into the conveyer buckets by the chute, these buckets may be properly filled while they are passing the end of the chute at the point where the chute B delivers the tooth picks to the conveyor C. The conveyer C consists of an endless belt 61 of leather or other suitable flexible material, provided with buckets (see Fig. 7) which consist of a base piece 62 riveted on one side only to the belt 61 as shown at 63 so that the buckets may pass around the wheels 10 safely and a V-shaped bucket composed of two leaves 64 and 65 preferably made integral with the base piece 62 or soldered thereto. The angle at which the two leaves 64 and 65 are inclined to the base 62 is such that the top edges of the adjacent leaves of two adjacent buckets just touch each other when the portion of the belt to which the buckets are attached is in a straight line so that it is not possible for a tooth pick to fall between the buckets. Side pieces or wings 7 and 8 (see Fig. 5) are provided which cover the ends of the buckets of the conveyer which are passing the delivery end of the chute B and serve to prevent the picks which come from said chute from passing beyond and out of the buckets. These wings or side pieces 7 and 8 are preferably made flaring, as shown in Fig. 5, thus projecting beyond the ends of the buckets, wing 7 extending on a level with the tops of the buckets while wing 8 to which the chute is attached projects slightly above the tops of the buckets. The flare of the said wings or side pieces allows a greater latitude for delivering the pick to the buckets so that the end of the pick may project beyond the bucket at the point where the pick enters the bucket from the chute B. The continued movement of the conveyer, however in the direction of the arrow Fig. 5 serves to bring the ends of the projecting picks in contact with the wings or side pieces 7 and 8 and the flare of the said side pieces operates as the buckets are carried along by the conveyer to force the picks inwardly on to the conveyer and place them all evenly in the buckets of the conveyer.

We provide at D a rotary brush journaled in uprights 9 on the sides 7 and 8 at the point where the conveyer belt begins to turn downwardly around the pulley 10. The brush D is rotated by any suitable means, as for example, by a belt 11, Figs. 4 and 5, which passes around a pulley 12 fast on a projecting end of the conveyer shaft 13, which carries the conveyer pulley 10.

The shaft 13 may as will be clear, be driven in any suitable manner. The rotation of the brush D serves to brush backwardly any excess of picks so that each bucket 3 as it passes under the brush D will be even full. After passing the brush D the bucket goes under the housing or guard 16 which prevents the picks from leaving the buckets of the conveyer until the buckets arrive at the point 17 when the picks contained therein drop into the partitioned passage E.

The passage E is preferably rectangular in cross section and of a sufficient size to permit the picks to drop sidewise therethrough. It is also preferably placed vertically so that the picks may fall or pass through the same by gravity.

To separate the picks and keep them from bunching or massing or falling end on, a number of sloping staggered partitions or slats 18 are secured in the said passage E. The lower edges of these slats 18 overalp each other slightly so that the picks as they drop strike and rest momentarily as they fall from one to another of these partitions, and are thus separated and maintained in a horizontal position and are prevented from dropping endwise.

To insure against the clogging of the picks in the passage E, a series of the partitions at one side of the said passage are pivoted; the pivoted partitions are designated 19, Fig. 1. These partitions are pivoted in substantially the same manner as are the slats of a window shutter, and are connected by a hook and eye or similar slat connection at their outer edges with a vertical rod 20 which is provided at its lower end with an eccentric 21 set on a shaft 22 so that as the shaft revolves the slats 19 are caused to move or to reciprocate and thus clogging of the picks in the passageway E is prevented. From the partitions or slatted passageway E the picks pass into a smaller chute or passageway G, which is of a width slightly in excess of the length of the pick and which is open centrally, as shown at 23, Fig. 3, for substantially the whole of its length below the end of the slatted passageway. The passageway G is also curved to correspond with the curve of a portion of the measuring wheel H, as shown at 24, Fig. 1. The measuring wheel H consists of a wheel having projecting fins or blades 25 set on the periphery thereof. These blades are relatively thin and sharp at their outer edges so that as the wheel H revolves in the direction indicated by the arrow, Fig. 1, the blades 25 will project through the slot 23 into the mass of tooth picks which are in the passageway G and will thus separate the tooth picks which are in the said passageway into masses containing any required number. If for example the boxes to be filled are to contain say 1000 tooth picks, the blades 25 will be set with reference to each other on the periphery of the wheel H so that the space of the passageway G between the two adjacent blades will contain 1000 tooth picks. As will be clear by varying the space between adjacent blades 25, the tooth picks in the passageway G may be divided into masses of any required size containing any required number of picks as may be necessary to fill the boxes which are shown at J and which rest on a conveyer belt K, as shown in Fig. 1. When a given number of picks has been separated in the passageway G by the blades 25, the continued movement of the measuring wheel H will cause the lower or forward blade to pass out of the passageway G, thus permitting the tooth picks that are behind the said blade and that are in front of the succeeding blade to drop through the lower portion of the passageway G which delivers the picks to that one of the boxes J which, at the moment, is directly beneath the lower end of the said passageway. The lower end of the chute or passageway G projects preferably slightly below the top of the box J so that the picks will be delivered into the box with certainty.
As the boxes are placed end to end on the conveyer K it is necessary before the adjacent ends of two boxes reach the lower end of the passage or chute G that they should be dipped downwardly in order that they may not collide with the lower end of the said chute or passageway. This is effected by means of a series of projections 27 which are secured to and project beyond the edges of the conveyer K. By causing these projections to travel under a cam 28 located opposite the end of the chute G the ends of the boxes are carried downwardly and are prevented from colliding with the lower end of the said chute. After the boxes have been filled with tooth picks, they are taken from the conveyer by an attendant operator and closed and secured, and are then ready for shipment.

The lower end 36 of the passageway or chute G may be formed from flexible material, such as leather or cloth or fabric, and thus there will be no necessity of dipping the boxes downwardly by means of the cam 28, as the boxes would move into position to be filled. In other words, the lower end of the chute G may be cut off, and in place thereof flaps or pieces of very flexible cloth or leather, see Fig. 8, may be secured to the end so that as the boxes are moved along into position they will shove the lower end of the chute out of place and after the end of the box has passed the lower end of the chute or passageway will again resume its normal position.
55. In place of the blades 25, prongs or pointed projecting pins may be employed, two or more of said pins being used in place of each of the blades 25.

What we claim is;
1. In a machine for boxing tooth picks, the combination with means for separating the picks from a mass, means for causing the separated picks to assume a position parallel with each other and delivering them into the buckets of a conveyer mechanism, a con- veyer mechanism and a chute or passageway connecting with said conveyer mechanism and from which the picks are discharged into the box to be filled.

2. In a machine for boxing tooth picks, the combination with means for separating the picks from a mass, means for causing the separated picks to assume a position parallel with each other and delivering them into the buckets of a conveyer mechanism, a conveyer mechanism, a chute or passageway connecting therewith and a measuring device coöperating with said chute or passageway whereby the picks in said passageway are separated into masses each of which is sufficient to fill a box of a predetermined size.

3. In a machine for boxing tooth picks, the combination with means for separating the picks from a mass, means for causing the separated picks to assume a position parallel with each other and delivering them into the buckets of a conveyer mechanism, a conveyer mechanism, a slatted chute or passageway into which the picks are received as they are discharged from the conveyer mechanism and from which they are delivered to a chute which in turn delivers them to the boxes to be filled.

4. In a machine for boxing tooth picks, the combination with means for separating the picks from a mass, means for causing the separated picks to assume a position parallel with each other and delivering them into the buckets of a conveyer mechanism, a conveyer mechanism, a slatted chute or passageway into which the picks are received as they are discharged from the conveyer mechanism and from which they are delivered to a chute which in turn delivers them to the boxes to be filled, said slatted chute or passageway having a portion of the slats therein movable.

5. In a machine for boxing tooth picks, a hopper having a bottom provided with a plurality of elongated slots paralled with each other, each of sufficient width to allow the widthwise passage of individual tooth picks, and another plurality of similar slots at right angles with the first set of slots and in the same plane therewith.

6. In a machine for boxing tooth picks, a hopper having a bottom provided with a plurality of elongated slots parallel with each other, each of sufficient width to allow the widthwise passage of individual tooth picks, another plurality of similar independent slots at right angles with the first set of slots and in the same plane therewith, and means for agitating the hopper.

7. In a machine for boxing tooth picks, the improved device for maintaining the picks in a parallel condition comprising a vertical passageway provided with oblique staggered slats slanting towards each other.

8. In a machine for boxing tooth picks, the improved device for maintaining the picks in a parallel condition comprising a vertical passageway provided with oblique staggered slats slanting towards each other, pivots for some of said slats, and moving means to cause some of said slats to oscillate about said pivots.

9. The boxing machine for tooth picks comprising a hopper, a chute converging toward its delivery end, a conveyer provided with buckets and a slatted passageway.

10. A boxing machine for tooth picks comprising a hopper, a chute converging toward its delivery end, a conveyer provided with buckets, a slatted passageway, and a measuring device.

11. In a machine for boxing tooth picks, a hopper having a bottom provided with a plurality of elongated slots parallel with each other, each of sufficient width to allow the widthwise passage of individual tooth picks, another plurality of similar independent slots at right angles with the first set of slots and in the same plane therewith, means for agitating the hopper, means for causing the tooth picks to assume a position parallel with each other after they have passed through said slots and means for conveying them to boxes.

In testimony whereof we affix our signatures, in presence of two witnesses.

GEORGE P. STANLEY.
WILLIS W. TAINTER.
SIMON S. TAINTER.

Witnesses:
JOHN R. TRASK,
WILLIAM A. MACLEOD.